July 7, 1936.   C. L. EKSERGIAN   2,047,137
ARTILLERY WHEEL STRUCTURE
Original Filed June 7, 1932
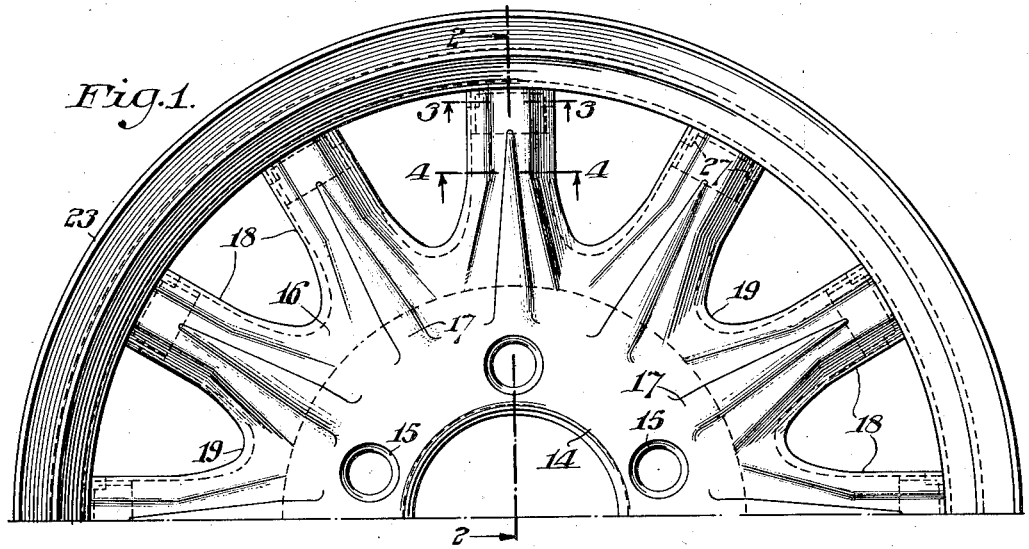
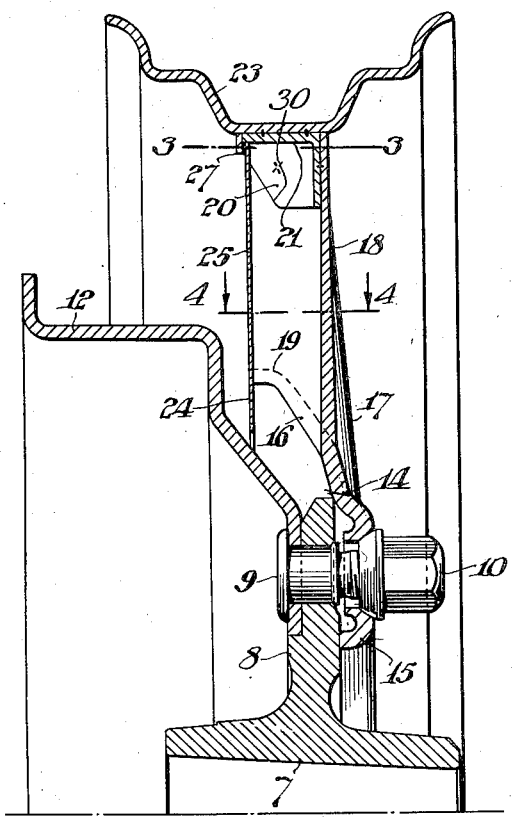
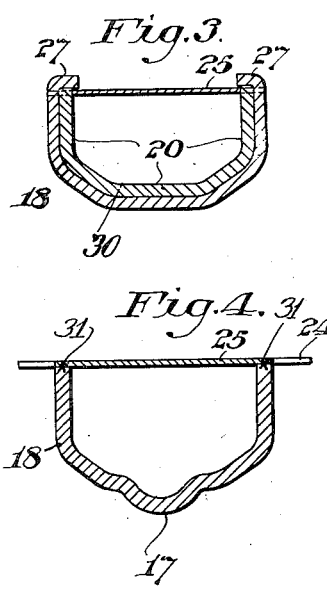
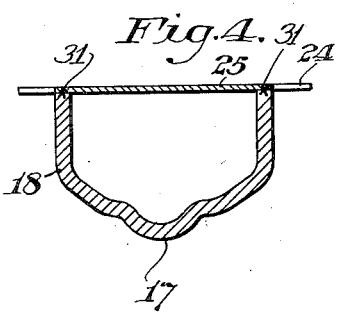
INVENTOR
Carolus L. Eksergian,
BY
ATTORNEY Patented July 7, 1936

2,047,137

UNITED STATES PATENT OFFICE 2,047,137

ARTILLERY WHEEL STRUCTURE

Carolus L. Eksergian, Detroit, Mich., assignor to Budd Wheel Company, Philadelphia, Pa., a corporation of Pennsylvania Application June 7, 1932, Serial No. 615,885
Renewed December 13, 1935

8 Claims. (Cl. 301—9)

My invention relates to wheels and particularly to pressed-metal wheels of the artillery-type.

One object of my invention is to close an artillery-wheel hollow-body stamping against the admission of moisture and other foreign matter thereto.

Another object is to facilitate the assembly of, and to strengthen the holding relation between, a hollow open-side wheel member and a closure element therefor.

A further object is to provide a metal wheel structure that shall be simple and durable in construction, economical to manufacture, effective in its operation, of light weight, without sacrificing necessary strength, proof against oxidation and an improvement generally in its field.

In practicing the invention, an outer load-sustaining stamping or spider, preferably of relatively heavy gauge sheet steel, is formed to have rear-opening spokes of channel section and a nave. In each spoke, a relatively short sheet-metal element, of rear-opening channel section conforming to the inner surfaces of the spoke, is provided with an outer-end transverse closure wall flush with the open outer end of the spoke to receive a rim in welded, riveted or otherwise attached, relation thereto; the sides of this rim-receiving member being secured to the sides of the spoke, as by welding, and extending only a sufficient distance radially inwardly of the spoke for such purpose.

A light-gauge, sheet-steel, preferably flat, cover-plate spider, conforming, in general, to the wheel-plane contour of the above mentioned load-sustaining spider, has radial finger plates fitted against the rear wheel-plane edges of the spokes and nave, and against the rear wheel-plane edges of the rim-receiving members, radially within the transverse end closure walls of the rim-receiving members.

The cover plate and its fingers are suitably sealed and secured in position to the nave and spokes, as by welding, about the adjacent edges thereof, but, in accordance with a salient feature of the invention, are further reinforced, and secured in position, adjacent to the radially-outer ends of the spokes, by integral tabs on the spokes. These tabs, originally in the form of flaps or ears extending axially continuously of the channel sides of the spokes at the outer ends thereof, are inturned, or bent inwardly of the spokes, parallel to the wheel plane, over the rear sides of the cover-plate fingers and against the axially-inner edges of the transverse end-closure walls of the rim-receiving members.

The arrangement of parts, whereby the outer ends of the thin-gauge cover plate fingers are entirely encased by the heavier-gauge spoke and rim-receiving elements, permits the plate to be thinner than would otherwise be the case; thus lessening the weight of the wheel, effecting a saving in die costs and wear, economizing in material, facilitating manufacture and assembly, and effecting other advantages.

The above-mentioned features are augmented by, or combined with, ribs on the spokes that so extend substantially throughout the major portions of the lengths of the spokes, or from the nave to positions axially opposite the rim-receiving members, as to add substantially to the strength of the spokes, without adding material, weight or cost:

Figure 1, of the accompanying drawing, is a view, in side elevation, of one-half of a wheel embodying the invention, Fig. 2 is a view, in enlarged axial section, of the device of Fig. 1, taken substantially along the line 2—2 thereof, Fig. 3 is a view, in further enlarged section, taken substantially along the lines 3—3 of Figs. 1 and 2, and Fig. 4 is a view, similar to Fig. 3, taken substantially along the lines 4—4 of Figs. 1 and 2.

Referring to the drawing, a hub 7 has a flange 8 for securing thereto, as by studs 9 and cap nuts 10, a brake drum 12 and a load-sustaining wheel body or spider, preferably of relatively heavy gauge stainless steel.

This spider comprises a mounting plate portion 14, having inturned flanges and conical seats 15 for the nuts 10, a conical nave portion 16, rearwardly opening outer side reinforcing ribs 17 of radially-outwardly converging tapered channel section and spokes 18 of rearwardly-opening channel section. The body is preferably of tapered gauge having substantially wheel-plane sides slightly converging radially outwardly from the mounting plate, along the nave and spokes. The nave is preferably also provided with axially-inner portions 19, perimetrically between the spokes, having wheel-plane rear surfaces flush with the rear surfaces of the spokes, or edges of the channel side walls thereof.

Outer-end closure, or rim-receiving members 30 for the spokes are each provided with side walls 20 and are of rearwardly opening channel section, conforming to the polygonal transverse-section contour of the spokes, and an outer-end closure wall 21. The side walls 20 are secured to the spoke, preferably by welding, and the wall 21 is adapted to receive a usual pressed metal rim 23, as by welding, riveting or otherwise securing it thereto.

A cover-plate spider, preferably of relatively thin-gauge stainless sheet-steel and initially divided into segments, has an annular portion 24, radially and axially inwardly of the nave, and is further provided with radially outwardly extending finger plates 25 conforming to, and fitted flat against, the rear wheel-plane surfaces or edges of the spokes 18. The rear wheel-plane surfaces, or edges, of the channel sides 20 of the rim-receiving members 30 are also flush against the adjacent sides of the fingers 25 but the radially outer end walls 21 thereof extend to the opposite, or rear sides of the finger portions 25 of the spider.

In this position, the cover plate and its fingers are welded preferably through the peripheries thereof which meet the wheel plane surface of the spokes and nave portions as at 31.

Tabs 27, that are initially axial extensions of the channel sides of the spokes, are provided adjacent to the outer ends thereof and bent inwardly of the spokes to embrace the outer end and adjacent side edges of the fingers 25; this feature strengthening the welded, or other, joints between the spokes and cover therefor, and constituting shielding means for the thin gauge finger ends at positions where they are most subject to damage or separation from the spokes.

By having the ribs 17 extend substantially throughout the major portions of the lengths of the spokes, or from the nave to positions axially opposite the inner ends of the rim-receiving elements 30, the spokes are materially strengthened throughout the lengths thereof, since the elements 30 take up the duty of reinforcing the spokes at the inner sides where the ribs taper or merge into the spokes at the outer sides.

While I have shown and described a particular form of my invention, changes may be effected therein without departing from the spirit and scope thereof, as set forth in the appended claims.

I claim as my invention:

1. A wheel comprising a sheet-metal stamping in the form of a spider including a nave and a spoke of rearwardly-opening channel section having transversely-inturned, rear-edge, outer-end tabs, a rim-receiving member of rearwardly-opening channel section in the spoke having an outer-end wall flush with the outer end of the spoke, and a spider having a flat-plate radial outer projection conforming to and closing, the open rear side of the spoke against the inner wheel-plane edges of said rim-receiving member radially inside said outer-end wall and embraced by said tabs.

2. A pressed metal artillery wheel body comprising a unitary spoke spider including a mounting flange portion, a plurality of substantially radially extending spokes, a substantially conical nave portion connecting said flange and spoke portions, said spokes being of deep U-section, said spider having its spoke and nave portions terminating in axially inner edges forming a wheel plane flat surface, and a closure member fitting flush against said surface and resistance welded thereto.

3. A pressed metal artillery wheel comprising a spoke member of axially inwardly opening channel section, a member of axially inwardly opening channel section fitting into the spoke member and secured thereto, said members having axially inner edges lying substantially in a plane, and a cover plate fitting against and secured to said coplanar edges and closing the open sides of said members.

4. A pressed metal artillery wheel comprising an open end spoke member of axially inwardly opening channel section, a member of axially inwardly opening channel section fitting into the channel section of the spoke and secured thereto and having a wall closing the outer end of the spoke member, said members having their axially inner edges lying substantially in a plane, and a cover plate fitting against said coplanar edges and resistance welded thereto, thereby closing the open sides of said members.

5. A pressed metal artillery wheel body comprising a unitary spoke spider including a mounting flange portion, a plurality of channel section spokes, and a substantially conically extending nave connecting said mounting flange and spokes and having the roots of the spokes pressed therefrom, and radial reinforcing ribbing extending from within said flange through the nave and spoke roots and into the main bodies of the spokes for a substantial portion of the length thereof.

6. An artillery wheel body having channel section spokes of relatively thick gauge, the edges of each spoke lying substantially in a plane and providing an axially presented attaching face, and a thin gauge cover plate fitting flatly upon the attaching face made by said coplanar edges and resistance welded thereto.

7. An artillery wheel body having channel section spokes of relatively thick gauge, the edges of each spoke lying substantially in a plane, and providing an axially presented attaching face and a thin gauge cover plate having a continuous annulus and spoke arms radiating therefrom, said spoke arms fitting flatly upon the attaching face made by said coplanar edges of the spokes and welded thereto.

8. An artillery wheel body having a nave portion and channel section spokes radiating therefrom and having root portions pressed from said nave portion, the outer periphery of the nave and the spokes having axially inwardly presented edge faces lying substantially in the same plane and providing attaching faces, and a thin gauge cover plate fitting flatly upon said coplanar attaching faces and resistance welded thereto.

CAROLUS L. EKSERGIAN.